United States Patent [19]

Juds

[11] Patent Number: 4,914,389

[45] Date of Patent: Apr. 3, 1990

[54] MULTITURN SHAFT POSITION SENSOR WITH BACKLASH COMPENSATION

[75] Inventor: Mark A. Juds, New Berlin, Wis.

[73] Assignee: Eaton Corporation, Cleveland, Ohio

[21] Appl. No.: 261,191

[22] Filed: Oct. 24, 1988

[51] Int. Cl.$^4$ .................... G01B 7/30; G01B 7/14
[52] U.S. Cl. .................... 324/207.21; 180/142; 324/207.25; 340/870.33
[58] Field of Search ............... 324/207, 208; 180/141, 180/142; 73/862.36, 862.69; 340/686, 870.33; 341/15

[56] References Cited

U.S. PATENT DOCUMENTS

| | | | |
|---|---|---|---|
| 4,774,465 | 9/1988 | Nilius | 324/208 |
| 4,783,626 | 11/1988 | Shimizu | 324/208 |
| 4,841,246 | 6/1989 | Juds et al. | 324/208 |

FOREIGN PATENT DOCUMENTS

| | | | |
|---|---|---|---|
| 0076056 | 7/1978 | Japan | 324/208 |
| 0497524 | 6/1973 | U.S.S.R. | 324/208 |

*Primary Examiner*—Gerard R. Strecker
*Attorney, Agent, or Firm*—J. G. Lewis

[57] ABSTRACT

The present invention is a shaft position sensor for detection of the position of a multiturn shaft. The rotation of the multiturn shaft is converted into a linear motion via a multiturn screw and two axially spaced non-rotating nuts which are oppositely continuously axially biased by intermediate compressed springs. A magnet is mounted on one of the nonrotating nuts. The linear movement of the magnet is converted into an electrical signal using a magneto resistive structure. A pair of flux plates is disposed on either side of the linear path of the magnet with a narrow gap opposite one end of the linear path of the magnet. The magneto resistive structure is disposed in the narrow gap. An electrical circuit measures the resistance of the magneto resistive structure, this resistance varying with magnetic flux, and generates an electrical position signal which indicates the rotary position of the multiturn shaft. Linearity in response can be provided by a flux shunt which blocks magnetic flux directly from the magnet, control of the distance of the flux plates from the linear path of the magnet.

11 Claims, 3 Drawing Sheets

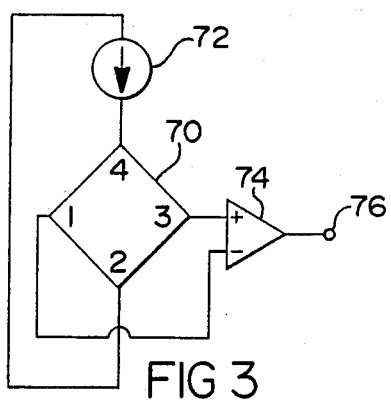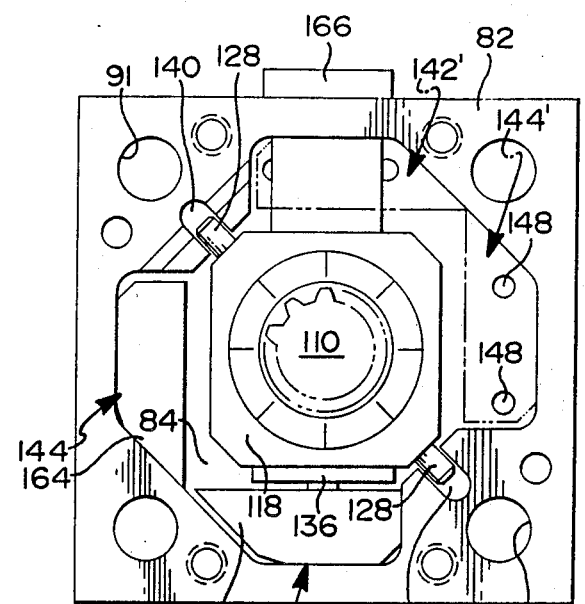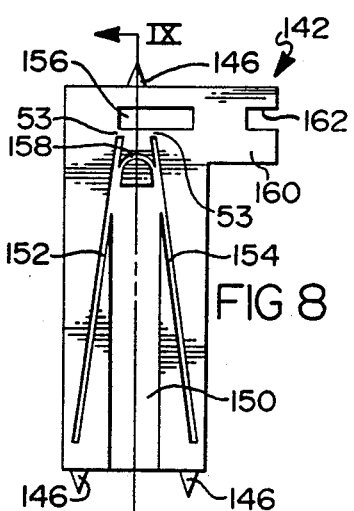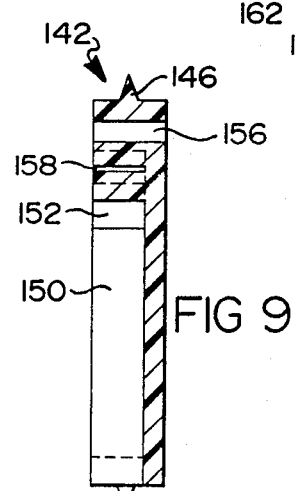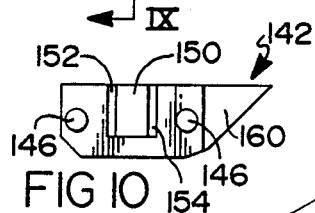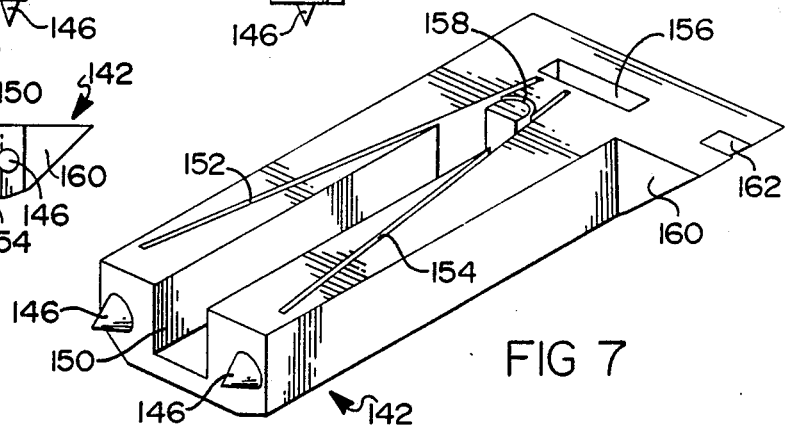

MULTITURN SHAFT POSITION SENSOR WITH BACKLASH COMPENSATION

TECHNICAL FIELD OF THE INVENTION

The technical field of the present invention is that of shaft position sensors and particularly those employed to detect the position of a multiturn shaft device such as a steering wheel in a vehicle.

CROSS REFERENCE

The invention described in the present application represents an improvement of that described in U.S. Ser. No. 139,218 filed Dec. 29, 1987, now U.S. Pat. No. 4,841,246 issued June 20, 1989.

BACKGROUND OF THE INVENTION

The present invention is directed to the field of shaft position sensors which are to operate on multiturn shafts. It is technically feasible to provide an unambiguous signal from a shaft encoding device to detect the position of a single turn of the shaft. However, such is not the case with a shaft that can operate through a multiplicity of turns.

Often it is desired to provide such an output with regard to a multiturn shaft. Such is the case with detecting the position of the steering wheel of a motor vehicle. Typically a steering wheel can be operated for multiple turns from full left turn to full right turn. Merely detecting the position of the shaft with an ambiguity of a full turn would not unambiguously detect the position of the controlled wheels. Thus, such a system without more would be inadequate to provide an indication of the turning of the vehicle.

This problem can be solved with auxiliary equipment as a part of the sensor device. A mechanical reduction gear could be employed to reduce the multiturn movement into movement of less than a single turn of a secondary shaft. A shaft encoder on this secondary shaft could thus resolve the ambiguity. Alternatively, a shaft encoder on the primary shaft could be connected to an electronic system to keep count of the turns both clockwise and counter clockwise to provide resolution of the ambiguity. Because of drawbacks in these systems, such as mechanical backlash in the case of a mechanical reduction system and the necessity for additional complex circuits for electronic systems, there is a need in the art for a simple system to unambiguously detect the position of a multiturn shaft.

A further problem arises in typical mechanically coupled sensors. Devices, built to less than perfect tolerances will exhibit backlash which tends to degrade performance, accuracy and repeatability of the sensor device. System wear over time tends to further degrade performance by increasing backlash.

SUMMARY OF THE INVENTION

The present invention is a shaft position sensor for detection of the position of a multiturn shaft. Such multiturn shafts are employed, for example, in the steering wheel in a vehicle. This invention operates in two steps.

Firstly, the rotation of the multiturn shaft is converted into a linear motion. This is accomplished using a multiturn screw and a nonrotating nut. The nonrotating nut is mounted on the multiturn screw which rotates in the same fashion as the shaft whose position is to be detected. The multiturn screw causes linear motion of the nonrotating nut. A spring continuously biases the nonrotating nut in one axial direction to eliminate backlash at nut-shaft thread interface.

Secondly, this linear motion is converted into an electrical shaft position signal. In accordance with the preferred embodiment of the present invention, this takes place as a result of varying magnetic flux. A magnet, which is preferably a permanent magnet, is mounted on the nonrotating nut and moves with the linear movement of the nonrotating nut. The linear movement of the magnet is converted into an electrical signal using a magneto resistive structure.

In the preferred embodiment, a single magneto resistive structure is employed. A pair of flux plates is disposed on either side of the linear path of the magnet. These flux plates are formed with a narrow gap opposite one end of the linear path of the magnet. The single magneto resistive structure is disposed in this narrow gap. The magnetic flux from the magnet, as detected by the magneto resistive structure in the narrow gap between the flux plates, varies with the position of the magnet along the linear path. An electrical circuit measures the resistance of the magneto resistive structure, this resistance varying with magnetic flux, and generates an electrical position signal which indicates the rotary position of the multiturn shaft.

Linearity in response can be provided by several techniques. A flux shunt is disposed between the position of a magneto resistive structure and the path of the magnet. This ensures that the magnetic flux through the magneto resistive structure is primarily due to the flux through the pair of flux plates and not due to the near field of the magnet. The distance of the flux plates from the linear path of the magnet is controlled to provide linear resistance response at the magneto resistive structure or structures. This provides greater or lesser magnetic flux from the magnet within the flux plates as the distance is greater or less.

According to an aspect of the present invention, a second nonrotating nut is mounted on the multiturn screw at a point axially spaced from the first nut. A spring is disposed intermediate the two nuts and is axially compressed to continuously oppositely react against the two nonrotating nuts. This arrangement has the advantage of providing substantially constant axial biasing against the magnet carrying nonrotating nut throughout its entire range of linear movement and thereby essentially eliminate any mechanical backlash at the threaded interface between the multiturn shaft and the nonrotating nut bearing a permanent magnet.

Various other features and advantages of this invention will become apparent upon reading the following specification, which, along with the patent drawings, describes and discloses a preferred illustrative embodiment of the invention in detail.

The detailed description of the specific embodiment makes reference to the accompanying drawings.

BRIEF DESCRIPTION OF THE DRAWINGS

FIG. 3, illustrates the electrical circuit of the preferred embodiment of the present invention;

FIG. 6, is a cross section view taken on lines VI—VI of FIG. 5;

FIG. 7, is a perspective view of a sensor mounting block contained within the sensor assembly of FIG. 4;

FIG. 8, is a front plan view of the sensor mounting block of FIG. 7 on a reduced scale;

FIG. 9, is a cross sectional view taken on lines IX—IX of FIG. 8;

FIG. 10, is a bottom view of the sensor mounting block of FIG. 8;

DETAILED DESCRIPTION OF THE PREFERRED EMBODIMENT

Figure 1:
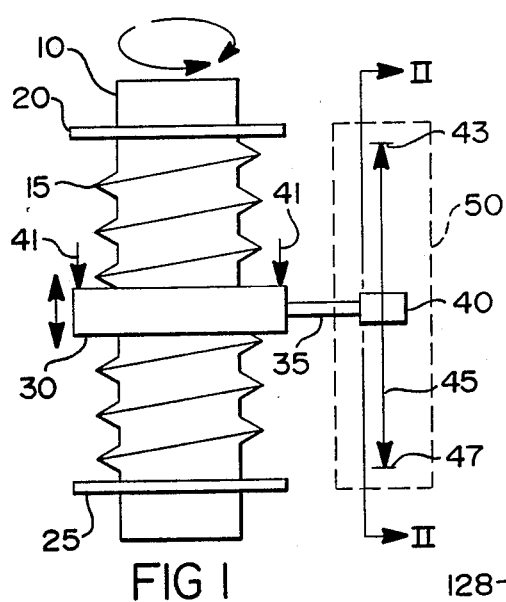
FIG. 1, illustrates the manner of converting the multiturn shaft motion into linear motion.

FIG. 1 illustrates the mechanical portion of the present invention in simplified form which converts the multiturn motion of the shaft into linear motion. Multiturn shaft 10 is mechanically coupled to the shaft whose position is to be detected. This connection is in a manner to insure correspondence between the rotary motion of the shaft whose position is to be detected and multiturn shaft 10. It is feasible that multiturn shaft 10 could be formed as a part of the shaft whose position is to be detected. Alternately, multiturn shaft 10 could be coupled to such a shaft via a gear or belt system.

Multiturn shaft 10 includes a thread 15. Mounted on multiturn shaft 10 at respective ends of thread 15 are end stops 20 and 25. End stops 20 and 25 prevent nonrotating nut 30 from running off the ends of thread 15. In the preferred embodiment end stops 20 and 25 correspond to the permitted range of motion of the shaft whose position is to be detected. Magnet 40 is coupled to nonrotating nut 30 via a shaft 35. Magnet 40 is preferably a permanent magnet.

It can be seen from FIG. 1 that rotary motion is converted into linear motion. As multiturn shaft 10 rotates thread 15 causes nonrotating nut 30 to travel linearly between end stops 20 and 25. This in turn causes magnet 40 to move along linear path 45 between first end 43 and second end 47. The linear motion of magnet 40 is employed to generate an electrical position signal in a manner detailed below. As will be described herein below means are provided to provide a constant axial bias, indicated by arrows 41 against nut 30 to eliminate backlash as it is displaced through its range of motion between end stops 20 and 25.

Figure 2:
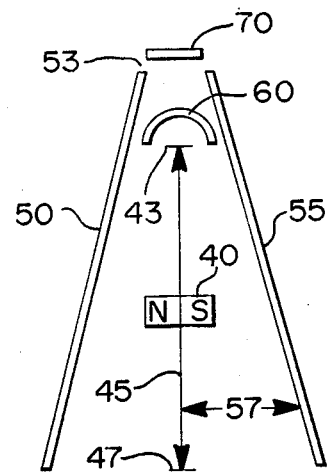
FIG. 2, illustrates the magnetic components of the preferred embodiment of the present invention employing a magneto resistive structure.

FIG. 2 illustrates the magnetic components in accordance with the preferred embodiment of the present invention. Disposed on either side of the path 45 of magnet 40 are a pair of flux plates 50 and 55. These flux plates 50 and 55 surround the path 45 of magnet 40 from first end 43 to second end 47. The multiturn shaft 10, thread 15, end stops 20 and 25 and nonrotating nut 30 are not illustrated in FIG. 2 for the sake of clarity, however, these parts appear below the flux plates 50 and 55 illustrated in FIG. 2. Flux plates 50 and 55 are disposed to create a narrow gap 53 therebetween beyond first end 43. Magneto resistive structure 70 is disposed in this narrow gap 53. A flux shunt 60 is disposed beyond first end 43 of path 45 between magneto resistive structure 70 and magnet 40.

The position of multiturn shaft 10 is detected by detecting magnetic flux within narrow gap 53. Flux plates 50 and 55, and flux shunt 60 are formed of a material high in magnetic permeability, such as steel. Thus, flux plates 50 and 55, and flux shunt 60 tend to cause the lines of the magnetic field from magnet 40 to follow these structures. As illustrated in FIG. 2, the distance 57 between path 45 and flux plate 55 varies with the position along path 45. The distance of flux plate 50 form path 45 varies similarly. As a consequence, a greater number of magnetic flux lines from magnet 40 touch flux plates 50 and 55 when magnet 40 is nearer first end 43 of path 45. Because flux plates 50 and 55 are formed of a material high in magnetic permeability, substantially all of these flux lines touching flux plates 50 and 55 follow these flux plates and consequently appear across narrow gap 53. Magneto resistive structure 70 is disposed in narrow gap 53 to detect the magnitude of magnetic flux. Magneto resistive structure 70 exhibits differing electrical resistance in the presence of differing magnetic flux intensity. Thus, the resistance of magneto resistive structure 70 is a measure of the position of magnet 40 along path 45 and hence of the position of multiturn shaft 10.

Flux shunt 60 is provided to increase the linearity of response between the resistance of magneto resistive structure 70 and the position of magnet 40. Flux shunt 60 serves to block the near field magnetism from magnet 40 from reaching magneto resistive structure 70 directly, that is without following flux plates 50 and 55. In the absence of flux shunt 60, magnetic flux from magnet 40 would reach magneto resistive structure 70 directly from magnet 40, especially when magnet 40 is near first end 43. This direct incidence of magnetic flux would result in a nonlinear response of the resistance of magneto resistive structure 70 to the position of magnet 40.

Further linearity adjustment can be made via the distance 57 between path 45 and the flux plates 50 and 55. The shape of the flair in flux plats 50 and 55 determines the relationship between the position of magnet 40 along path 45 and the flux appearing across narrow gap 53. It is feasible to provide a nonlinear flair in flux plates 50 and 55 to compensate for nonlinearity in the response of magneto resistive structure 70 to magnetic flux.

FIG. 3 illustrates in schematic form the electrical circuit for detecting the resistance of magneto resistive structure 70. In accordance with the present invention the magneto resistive structure is constructed as a Wheatstone bridge. This enables greater sensitivity to any changes in the resistance caused by changing magnetic fields. In accordance with the present invention a constant current source 72 is employed to drive opposite arms 2 and 4 of the Wheatstone bridge of the magneto resistive structure 70. The voltage difference appearing across the other pair of arms 1 and 3 is measured. The voltage at arm 1 is applied to the inverting input of operational amplifier 74 and the voltage at arm 3 is applied to the noninverting input of operational amplifier 74. Operational amplifier 74 thus provides a measure of the differential resistance within magneto resistive structure 70 at output terminal 76.

Figure 4:
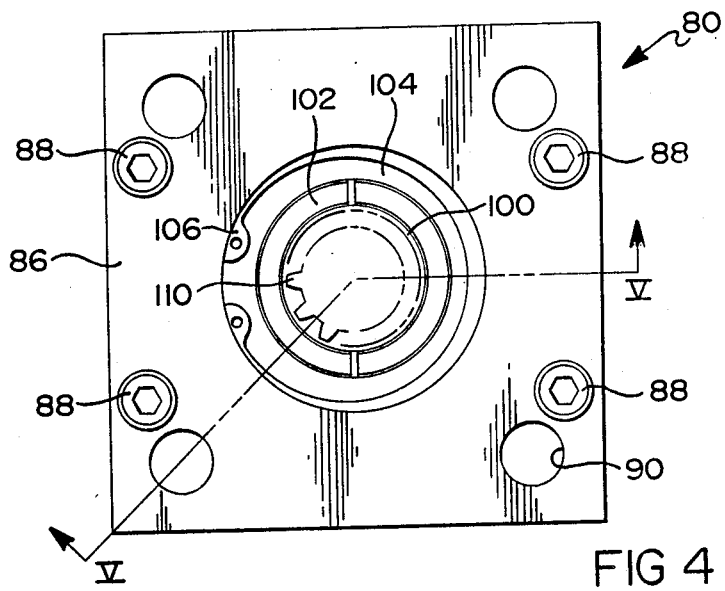
FIG. 4, is a top plan view of the preferred embodiment of a multiturn shaft position sensor.
Figure 5:
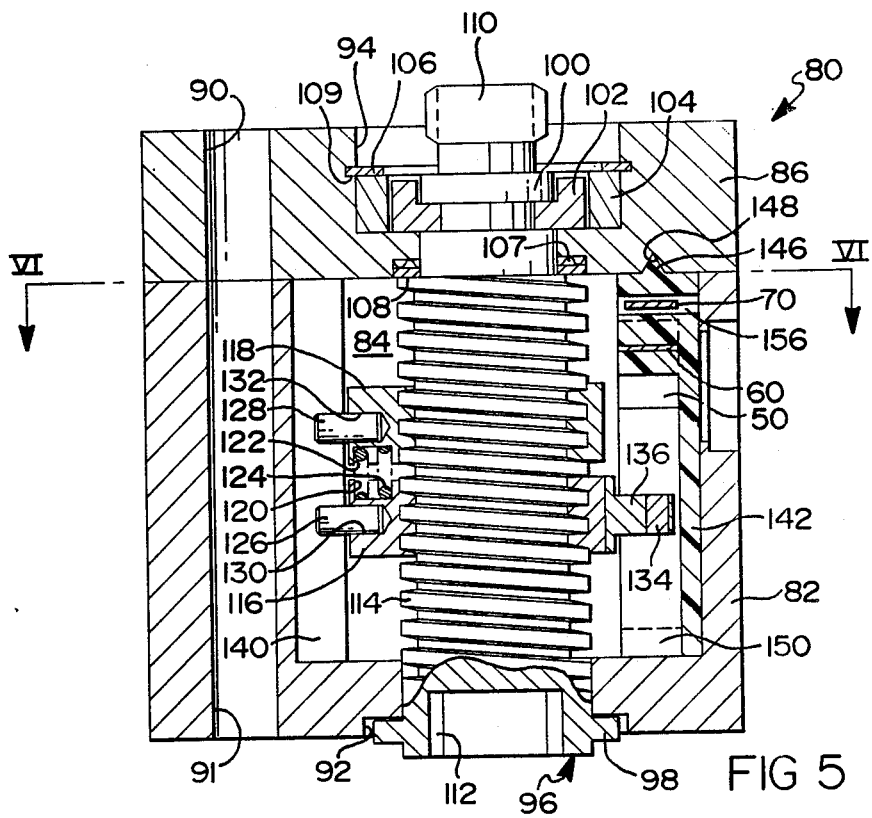
FIG. 5, is a cross section taken on lines V—V of FIG. 4 illustrating the internal details of the sensor.

Drawing FIGS. 4–12 collectively illustrate the structural details of the preferred embodiment of the invention which operates essentially as described herein above with respect to drawing FIGS. 1-3. Referring to FIGS. 4 and 5, a position sensor 80 is shown in assembly, including a generally cubical housing 82 defining an interior cavity 84 closed by cover 86. Housing 82 and cover 86 are held in assembly by suitable fastener means such as screws 88. Housing 82 and cover 86 also define registering through passageways 90 and 91 for receiving mounting hardware (not illustrated) in application. Housing 82 and cover 86 are constructed of suitable material such as steel to provide a mechanically robust structure appropriate for the intended application as well as providing isolation from external sources of magnetic and radio frequency radiation.

Registering stepped apertures 92 and 94 are formed in housing 82 and cover 86, respectively. A shaft 96 is disposed within apertures 92 and 94, extending through interior cavity 84. As viewed in FIG. 5, the lower end of shaft 96 forms an outwardly extending annular flange 98 near the lower end thereof residing within a step of aperture 92 acting as a thrust bearing restricting upward displacement of shaft 96 with respect to housing 82. Likewise, the upper end of shaft 96 as an annular flange 100 formed therein which abuts a split thrust member 102 within stepped aperture 94. Thrust member 102 is retained by an annular positioner ring 104 which, in turn, is axially restrained by a snap ring 106 disposed within a radially inwardly opening groove 109 within aperture 94 of cover 86. Thus, in assembly, shaft 96 is axially retained in its illustrated position with respect to housing 82 and cover 86 but is free for rotation about its axis. A thrust washer 108 is provided within aperture 94. A wave spring 107 is disposed between thrust washer 108 and cover 86 to bias shaft 96 downwardly and thereby eliminate position variation of magnet 134 due to clearance requirements. The upper and lower ends of shaft 96 are provided with appropriate sprockets 110 and 112 for mating with other parts of a host system (example steering) system.

Figure 11:
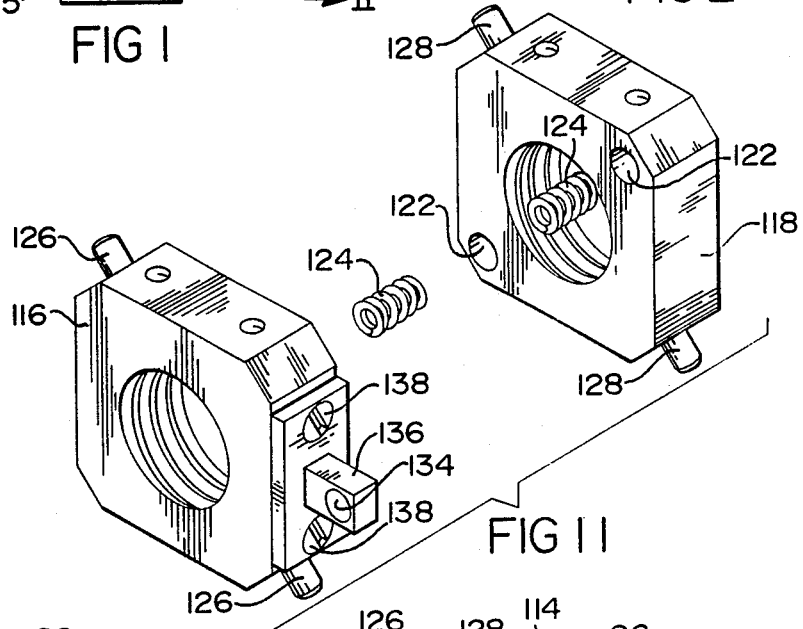
FIG. 11, is an exploded perspective view illustrating a pair of nonrotating nuts for assembly with two inner fitting biasing springs.
Figure 12:
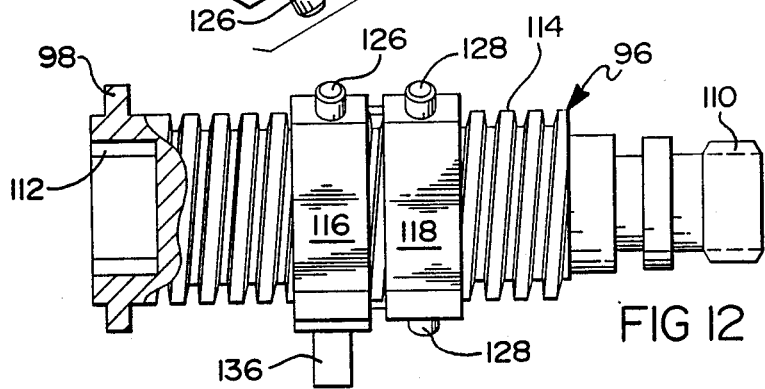
FIG. 12, is a broken plan view of a multiturn shaft for use in the sensor of FIG. 4 is assembly with the nonrotating nuts of FIG. 11.

The central portion of shaft 96 defines a course pitch thread 114 axially traversing cavity 84. As is best seen in FIGS. 5, 11 and 12, two nuts 116 and 118 are threadably engaged upon thread 114 within cavity 84. Nuts 116 and 118 define registering sets of blind bores 120 and 122, respectively for receiving coil springs 124. Nuts 116 and 118 each contain a pair of diagonally opposed outwardly projecting locator pins 126 and 128, respectively, press fit within sets of blind bores 130 and 132, respectively. A circumferentially polarized generally cylindrical permanent magnet 134 is press fit within a magnet mount 136 secured to and carried by nut 116 by suitable hardware such as screws 138.

Referring to FIGS. 5 and 6, the interior portion of housing 82 defining cavity 84 defines two vertically extending opposite inwardly directing slots 140 dimensioned to loosely entrap pins 126 and 128 of nuts 116 and 118, respectively. Thus, in assembly, nuts 116 and 118 are restrained rotationally with respect to housing 82 and, by virtue of their threaded engagement with shaft 96, have a limited freedom of linear vertical displacement between an upward limit of travel wherein the uppermost surface of nut 118 contacts the lowermost surface of cover 86 and a lowermost limit of travel wherein the lowermost surface nut 116 contacts the portion of housing 82 defining the bottom of cavity 84.

As best seen in FIGS. 5 and 12, nuts 116 and 118 are slightly axially displaced a fixed distance from one another and positioned whereby bores 120 and 122 are in registry to retain springs 124 therein. Springs 124 are under compressive loading and thus tend to simultaneously urge nut 116 downwardly and nut 118 upwardly. This biasing effect is independent of the relative position of nuts 116 and 118 upon shaft 114. Thus, the biasing effect is deemed continuous and constant throughout the linear range of operation of nuts 116 and 118. This opposed biasing of nuts 116 and 118 virtually eliminates backlash between the nuts 116 and 118 at their threaded interface with threads 114 of shaft 96. Thus, when sensor 80 is subjected to vibration, mechanical wear or other rigors of operation, reliable and repeatable positioning of magnet 134 is effected.

Referring to FIGS. 5 and 6, cavity 84 is configured to nestingly receive a sensor mounting block 142 and a circuit mounting block 144 therein. Suitable means, such as adhesives, are provided to temporarily retain blocks 142 and 144 in their illustrated positions so as not to interfere with the movement of nuts 116 and 118 within cavity 84. Blocks 142 and 144 are constructed of suitable electrically insulating material such as plastic and are held in final assembly in their illustrated positions by a system of locating nibs 146 nesting within mating conical recesses 148 formed in the lower surface of cover 86 and the lower portion of housing 82 defining the bottom surface of cavity 84.

Referring to FIGS. 7-10, the details of sensor mounting block 142 are illustrated. Block 142 is a generally rectangular structure defining an axially elongated magnet receiving recess 150 extending nearly the entire length thereof. Recess 150 is open at the bottom and the inner wall of block 142 nearest nuts 116 and 118 whereby (referring to FIG. 5) magnet mount 136 and magnet 134 can extend therein in a noncontacting manner. Two symmetrical upwardly converging flux plate receiving slots 152 and 154 communicate with the upper end of magnet receiving recess 150 and terminate at their point of closest approach mutually adjacent a magneto resistive structure receiving recess 156. An arcuate flux shunt receiving slot 158 interconnects the upper ends of flux plate receiving slots 152 and 154 at a point vertically intermediate the point of slots 152 and 154 communicating with magnet receiving recess 150 and magneto resistive structure receiving recess 156. Slots 152, 154 and 158 as well as recess 156 are open to the inner surface of block 142 nearest nuts 116 and 118 in assembly. Sensor mounting block 142 includes an obliquely extending guide portion 160 defining a wire routing channel 162 therein.

Circuit mounting block 144 is illustrated only in outline form in FIG. 6 and, in application, functions to insulate and house the electrical circuit illustrated schematically in FIG. 3 within the protective confines of housing 82. It is contemplated that block 144 would be merely a hollowed out structure containing the constituent circuit components which are held in position by potting or other suitable means well known in the art. For the sake of brevity, the details thereof are deleted here.

As can best be seen in FIG. 6, in assembly, blocks 142 and 144 are disposed adjacently within cavity 84. Flux plates 50 and 55 are press fit within receiving slots 152 and 154 respectively. Likewise, flux shunt 60 is press fit within slot 158 so that the end portions thereof are slightly spaced from plates 50 and 55 as described herein above. Magneto resistive structure 70 is positioned within recess 156 sand held in symmetrical alignment with the uppermost ends of flux plates 50 and 55 by suitable potting material or the like. The wires from magneto resistive structure 70 are routed through channel 162 and into an adjacent similarly shaped guide portion 164 formed in circuit mounting block 144.

As described above, an output signal is provided at terminal 76 (see FIG. 3). In the preferred embodiment of the invention (FIG. 6) the output is provided via a connector 166 embedded in a suitable location within a sidewall of housing 82 with suitable electrical innerconnections (not illustrated) with the remaining circuit components housed within circuit mounting block 144.

An optional independent second output could be provided with the provision of a second sensor mounting block 142' and circuit mounting block 144' as illustrated in phantom in FIG. 6. This arrangement would also require the provision of a second magnet and magnet mount, flux plates, flux shunt and magneto resistive structure in the manner as described herein above.

It is to be understood that the invention has been described with reference to a specific embodiment to provide the features and advantages previously described and that such specific embodiment is susceptible of modification, as will be apparent to those skilled in the art. Accordingly, the foregoing is not to be construed in a limiting sense.

What is claimed is:

1. A multiturn shaft position sensor for detecting the position of a multiturn shaft comprising:
   a multiturn screw disposed to turn with the multiturn shaft;
   first and second axially spaced nonrotating nuts mounted on said multiturn screw for linear movement dependent upon the turning of said multiturn screw;
   biasing means reacting between said nonrotating nuts to simultaneously bias said nuts in opposite directions along the axis of said multiturn screw;
   a magnet disposed upon said first nonrotating nut for linear movement along a predetermined movement path from a first end to a second end with said linear movement of said first nonrotating nut;
   a pair of flux plates formed of a material of high magnetic permeability disposed on opposite sides of said movement path of said magnet having a narrow gap therebetween opposite said first end of said movement path;
   a magneto resistive structure disposed in said narrow gap between said pair of flux plates having an electrical resistance dependent upon the magnetic flux therethrough; and
   an electrical circuit connected to said magneto resistive structure for measuring said electrical resistance of said magneto resistive structure and generating a position signal indicative of the position of the multiturn shaft proportional to said electrical resistance of said magneto resistive structure.

2. The multiturn shaft position sensor as claimed in claim 1, wherein the multiturn shaft is connected to a vehicle steering wheel and said position signal indicates the position of the steering wheel.

3. The multiturn shaft position sensor as claimed in claim 1, wherein said magnet is a permanent magnet.

4. The multiturn shaft position sensor as claimed in claim 1, further comprising:
   a flux shunt formed of a material high in magnetic permeability disposed between said pair of flux plates opposite said first end of said movement path for shielding said magneto resistive structure from direct magnetic fields from said magnet, whereby the magnetic flux through said magneto resistive structure is primarily from said pair of flux plates.

5. The multiturn shaft position sensor as claimed in claim 1, wherein:
   said pair of flux plates have a distance therebetween which increases for portions of said pair of flux plates which are further from said first end of said movement path, whereby the magnetic flux from said magnet within said narrow gap is greatest when said magnet is near said first end of said movement path and decreases for portions of said movement path further from said first end of said movement path.

6. The multiturn shaft position sensor as claimed in claim 5, wherein:
   said distance between said pair of flux plates varies with the distance from said first end of said movement path whereby said electrical resistance of said magneto resistive structure changes linearly with the distance of said magnet from said first end of said movement path.

7. A multiturn shaft position sensor for detecting the position of a multiturn shaft comprising:
   a magnet for generating magnetic flux;
   a means connected to the multiturn shaft and said magnet for converting multiturn motion of the multiturn shaft into linear motion of said magnet along a predetermined movement path;
   means continuously biasing said means connected to the multiturn shaft in one direction along the axis of said multiturn shaft;
   at least one magneto resistive structure disposed for receiving said magnetic flux from said magnet which differs depending upon the location of said magnet along said movement path, said at least one magneto resistive structure having an electrical resistance dependent on the magnitude of received magnetic flux;
   an electrical circuit connected to said at least one magneto resistive structure for measuring said electrical resistance of said at least one magneto resistive structure and generating a position signal indicative of the position of the multiturn shaft proportional to said electrical resistance of said at least one magneto resistive structure.

8. The multiturn shaft position sensor as claimed in claim 7, wherein said biasing means exerts a substantially constant axial force component upon said means connected to the multiturn shaft independent of the axial position of said means connected to the multiturn shaft.

9. A multiturn shaft position sensor for detecting the position of a multiturn shaft comprising:
   a first and second magnets for generating magnetic flux;
   means connected to the multiturn shaft and said magnets for converting multiturn motion of the multiturn shaft into linear motion of said magnets along a predetermined movement path;
   means continuously biasing said means connected to the multiturn shaft in one direction along the axis of said multiturn shaft;
   a first magneto resistive structure disposed for receiving magnetic flux from said first magnet which differs depending upon the location of said first magnet along said movement path, said first magneto resistive structure having an electrical resistance dependent of the magnitude of received magnetic flux;

a first electrical circuit connected to said first magneto resistive structure for measuring said electrical resistance of said first magneto resistive structure and generating a first position signal indicative of the position of the multiturn shaft proportional to said electrical resistance of said first magneto resistive structure.

a second magneto resistive structure disposed for receiving magnetic flux from said second magnet which differs depending upon the location of said second magnet along said movement path, said second magneto resistive structure having an electrical resistance dependent on the magnitude of received magnetic flux;

a second electrical circuit connected to said second magneto resistive structure for measuring said electrical resistance of said second magneto resistive structure and generating a second position signal indicative of the position of the multiturn shaft proportional to said electrical resistance of said second magneto resistive structure.

10. The multiturn shaft position sensor as claimed in claim 7, further comprising housing means carrying said multiturn shaft for rotation at opposite ends thereof, said housing means including means associated with one shaft end operative to limit axial freedom of movement of said shaft when said means connects to said shaft is at one axial limit of travel, said housing means further including means associated with another shaft end operative to limit axial freedom of movement of said shaft when said means connects to said shaft is at another axial limit of travel, whereby shaft rotation is limited to a predetermined range without imposing compressive or tensile forces between said means associated with said shaft ends.

11. The multiturn shaft position sensor as claimed in claim 10, wherein at least one of said means associated with one shaft end is further operative to maintain said magnet end means connected to the multiturn shaft in a spaced relation with said magnet resistive structure.

* * * * *